United States Patent [19]

Krauter et al.

[11] Patent Number: 5,014,600
[45] Date of Patent: May 14, 1991

[54] BISTEP TERMINATOR FOR HYDRAULIC OR PNEUMATIC MUSCLE

[75] Inventors: Allan I. Krauter, Syracuse; Robert L. Vivenzio, Auburn, both of N.Y.

[73] Assignee: Welch Allyn, Inc., Skaneateles Falls, N.Y.

[21] Appl. No.: 475,822

[22] Filed: Feb. 6, 1990

[51] Int. Cl.⁵ ............................ F01B 19/00; F16J 3/00
[52] U.S. Cl. .......................................... 92/92; 92/90; 128/4
[58] Field of Search ............. 92/89, 90, 91, 92, 103 F; 128/4

[56] References Cited

U.S. PATENT DOCUMENTS

| | | | |
|---|---|---|---|
| 2,483,088 | 9/1949 | De Haven | 92/92 |
| 3,282,223 | 11/1966 | Karkut | 92/92 |
| 3,638,536 | 2/1972 | Kleinwachter et al. | 92/92 |
| 3,645,173 | 2/1972 | Yarlott | 92/92 |
| 4,615,260 | 10/1986 | Takagi et al. | 92/92 |
| 4,715,588 | 12/1987 | Drescher et al. | 92/92 |
| 4,721,030 | 1/1988 | Paynter | 92/92 |
| 4,751,869 | 6/1988 | Paynter | 92/103 F |
| 4,819,547 | 4/1989 | Kukolj | 92/261 |
| 4,841,845 | 6/1989 | Beullens | 92/103 F |
| 4,860,639 | 8/1989 | Sakaguchi | 92/92 |

Primary Examiner—John T. Kwon
Assistant Examiner—Thomas Denion
Attorney, Agent, or Firm—Wall and Roehrig

[57] ABSTRACT

A terminator for a hydraulic or pneumatic muscle seals the end of the internal elastomeric bladder and provides direct transfer of force between the external braid and a mechanical device to which the terminator is connected. The terminator is provided with an annular land or step at the end that is inserted into the corresponding end of the muscle, a first valley or recess after the first annular land, a second annular land or step adjacent the first recess, a second annular valley or recess adjacent the second land and axially separated from the first recess, and an anchor or attachment portion beyond the second valley or recess which provides a point of attachment for the end of a cable or for a tubular sheath or the like. The bladder is attached to the first recess to form a fluid-tight seal, and the end of the braid continues over this and over the second land, and is attached to the second valley or recess. The attachments can be made using coils or wraps of fishline or equivalent.

17 Claims, 1 Drawing Sheet

BISTEP TERMINATOR FOR HYDRAULIC OR PNEUMATIC MUSCLE

BACKGROUND OF THE INVENTION

This invention relates to hydraulically or pneumatically actuated muscles, that is, devices which convert a fluid pressure into a tensive force. The invention is more specifically directed to terminator or obturator structure for sealing one or both ends of an elongated bladder of the hydraulic muscle and also providing for force transfer between a tubular braid of the muscle and an anchor point or cable. For purposes of discussion, the term "muscle" is used both for a hydraulic or pneumatic actuator which converts fluid pressure to mechanical force, and for a fluid pump that converts a tensive mechanical force to a pressure.

Hydraulic muscles can be favorably employed in an elongated flexible probe such as a borescope or endoscope for actuating its articulation or steering section. With the use of hydraulic muscles, the conventional long steering cables can be eliminated. This use of a hydraulic muscle in a borescope or endoscope is described in U.S. patent application Ser. No. 357,806, filed May 30, 1989, and having a common assignee herewith. Another fluid dynamic muscle in a borescope or endoscope is described in U.S. Pat. No. 4,794,912, granted Jan. 3, 1989. Fluid dynamic articulation and steering for a borescope or endoscope offers a distinct improvement over the conventional system of steering cables, permitting much more accurate and precise positioning of the viewing end of the instrument within the cavity to be inspected.

The hydraulic, or fluid dynamic muscle is made of an elongated tubular bladder which is encased in an elongated tubular braid member disposed over it. Terminators are provided at the proximal and distal ends of the muscle to seal the ends of the bladder and to provide a place for mechanical attachment between the ends of the braid member and the mechanical members to which they are to transfer force, e.g. a cable or a muscle sheath. The braid permits the bladder within it to expand laterally when hydraulic pressure is applied to it. However, as the braid and bladder expand radially, the braid contracts axially and generates an axial tensive force.

Currently, the practice is to bind the braid and bladder down with a cord or cinch onto the terminator which is in the form of an elongated cylinder. This means that any mechanical forces transferred between the terminator and the braid member must also pass through the end of the bladder. If the device is subjected to axial forces exceeding about 20 pounds, or to an internal fluid pressure above about 100 psig, there tends to be axial slippage of the external braid and internal bladder relative to the terminator. Fluid can also leak out around the terminator under these circumstances.

OBJECTS AND SUMMARY OF THE INVENTION

It is an object of this invention to provide an improved hydraulic or pneumatic muscle having an internal bladder, an external braid, a fluid line in communication with the interior of the bladder, and a terminator disposed at either or each end and which avoids the drawbacks of the prior art.

It is another object of this invention to provide a terminator for either the proximal or distal end of the muscle, which provides direct mechanical connection to the braid member while securely sealing the bladder, and which avoids mechanical stresses at the ends of the tubular bladder.

It is a further object of this invention to provide a terminator which permits the muscle to withstand high axial tensile forces and high internal fluid pressures.

According to an aspect of the invention, the terminator is provided with an annular land or step at the end that is inserted into the muscle, a first valley or recess after the first land, a second annular land or step adjacent the first recess, a second annular valley or recess adjacent the second land and axially separated from the first recess, and an anchor or attachment portion beyond the second valley or recess that provides a point of attachment for the end of the cable or for a tubular muscle sheath that connects with the cable sheath. The bladder is attached to the first recess to form a fluid-tight seal, and the end of the braid continues over this and over the second land, and is attached to the second valley or recess. This attachment can be made using coils or wraps of fishline or equivalent. This structure ensures that the tensile forces on the terminator are transmitted directly to the braid member, and are not applied directly to the end of the bladder. In the case of the proximal terminator, there is a bore extending axially therethrough, and a hydraulic nipple extends out to connect to a flexible hydraulic line and to communicate fluid pressure to the interior of the bladder. The anchor portion of the terminator can include a threaded section.

The above and many other objects, features, and advantages of this invention will become more fully understood from the ensuing description of a preferred embodiment, to be read in connection with the accompanying Drawing.

DETAILED DESCRIPTION OF A PREFERRED EMBODIMENT

Figure 1:
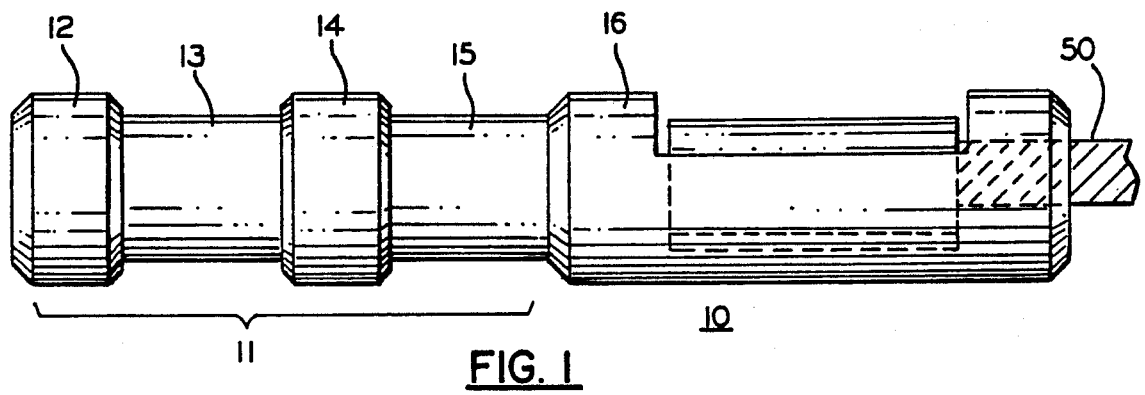
FIG. 1 is a side elevation of distal terminator according to an embodiment of this invention.

With reference to the Drawing, a distal-end terminator 10 is shown as a generally cylindrical elongated block and having an obturator portion 11 which serves to seal and block fluid flow from the distal end of a hydraulic muscle and to serve as an attachment point for transmitting mechanical forces between the braid of the muscle and a cable 50. The obturator portion 11 has an annular land or step 12 at its proximal end, and an annular valley or recess 13 adjacent to it. A second annular land or step 14 is situated adjacent the valley 13, and a second 25 annular valley or recess 15 is formed adjacent the step 14, so that the second annular valley 15 is axially separated somewhat from the first annular valley 13. Adjacent the second valley 15 is an anchor portion 16, here of greater diameter than the valley 15 and adapted to receive a cable end 51 for a steering cable or the like.

Figure 2:
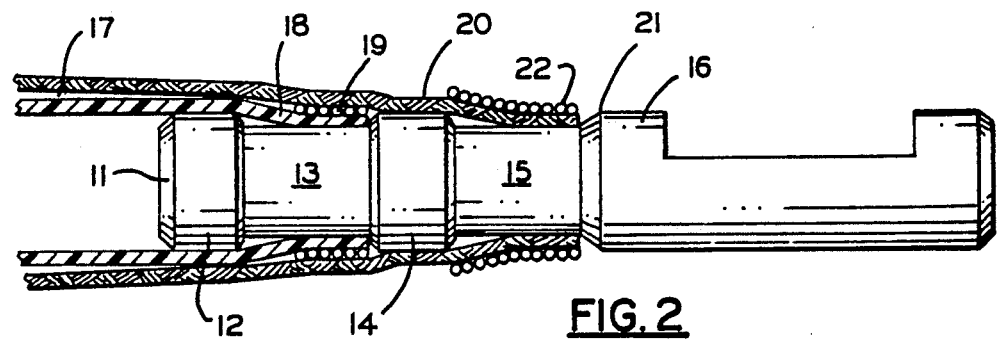
FIG. 2 is another view of the distal terminator place in a distal end of a hydraulically actuated muscle, the latter shown in section.

As shown in FIG. 2, an elongated elastomeric bladder 17 for a hydraulic muscle has a distal end 18 that extends over the first land or step 12 into the valley 13. The bladder end 18 is bound with a coil of fishline or equivalent 19. The fishline provides a radial inward force to hold the end 18 of the bladder in sealing engagement against the valley 13 and step 12. A tubular braid of the hydraulic muscle is formed of interwoven, substantially inextensible filaments, and is disposed over the bladder 17. The braid 20 has a distal end 21 that is secured by a wrap or coil 22 of fishline or equivalent at the second valley 15.

It can be readily appreciated that the intermediate annular step 14 actually separates the zone of attachment of the bladder 17 to the terminator 10 from the zone of attachment of the braid 20 to the terminator 10. As a result of this, any tensile forces are transmitted directly from the external braid 20 to the terminator 10 without having to pass through the bladder 17. The braid-to-terminator connection is more rigid than is possible in those systems in which the braid end is secured onto the end 18 of the bladder 17. Instead, the arrangement of the present invention removes the intermediate compliant bladder 18 from between the terminator 10 and the braid 20. Eliminating the intermediate bladder avoids cutting of the bladder 17 by the braid 20, due to the combination of the internal fluid pressure and radial pressure of the fishline or equivalent cord or monofilament material.

Standard fishline or equivalent wraps and appropriate adhesive can be employed with both coils 19 and 22. Increased sealing reliability can be obtained by using an appropriate sealant between the bladder 18 and the terminator 10. The coils 22 that attach the braid to the valley 15 can extend somewhat onto the second step 14, but should not extend so as to overlap the coils 19 that are associated with the bladder end 18.

Figure 3:
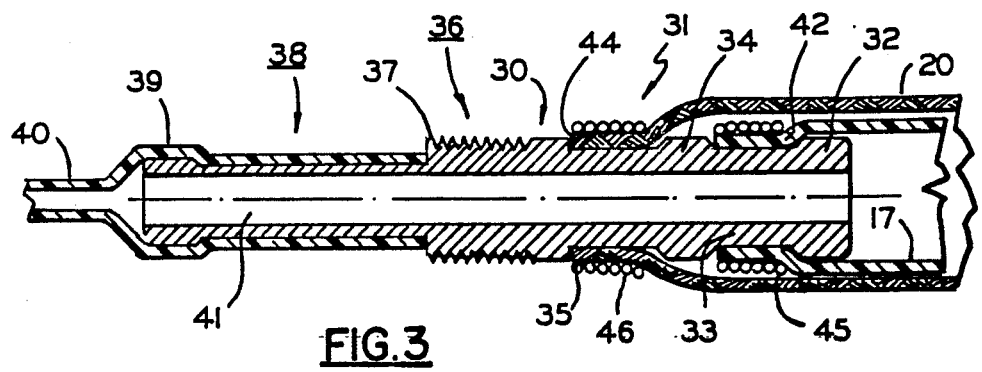
FIG. 3 is a cross section of a proximal terminator in place in a proximal end of the hydraulically actuated muscle.

A proximal terminator 30 is shown in FIG. 3. This terminator 30 has a distal portion 31 that fits into and seals the proximal end of the bladder 17 and braid 20 of the hydraulic muscle. At the distal tip there is a first annular land or step 32, a first annular recess or valley 33 proximally thereof, a second annular land or step 34 proximally of the valley 33, and a second annular valley or recess 35 adjacent to the annular land 34 and axially separated from the first valley or recess 33. An anchor portion 36 is situated adjacent the second valley 35 and has a threaded section 37 onto which a threaded anchoring device (not shown) can be attached.

A tubular hydraulic fitting or nipple 38 extends proximally from the anchor portion 36, with a tube barb 39 at its proximal end. A hydraulic tubing 40 fits over the tube barb onto the fitting 38. An axial bore 41 through the length of the terminator 30 communicates fluid pressure from the hydraulic tubing 40 to the interior of the bladder 17.

In similar fashion as with the distal terminator, a proximal end 42 of the bladder 17 is received in the valley or recess 33 and a proximal end 44 of the braid 20 is received in the second valley or recess 35. The bladder end 42 and braid end 44 are secured with respective coils 45 and 46 of fishline or equivalent.

In a typical realization, the terminators 10 and 30 can be about ⅛" in diameter and about ⅜" in length, and formed of brass or other durable metal.

With the terminators 10 and 30 of this invention, the ends of the fluid muscle can withstand high axial tensile forces and high internal fluid pressures without leaking or breaking and without cutting of the bladder 17 by the braid 20. Also, this construction eliminates slippage of the bladder 17 or braid 20 relative to the terminator 10 or 30 under the force and pressure conditions likely to be encountered. The terminator-and-muscle assembly is relatively simple to construct, yet produces a muscle of high reliability.

While this invention has been described in detail with respect to a preferred embodiment, it should be understood that this invention is not limited to that precise embodiment. Rather, many modifications and variations would present themselves to those of skill in the art without departing from the scope and spirit of this invention, as defined in the appended claim.

What is claimed is:

1. A terminator for a pneumatic or hydraulic muscle of the type that comprises an elongated elastomeric tubular bladder, an elongated tubular braid member disposed over said bladder, one or more generally cylindrical terminators disposed at one or both of a proximal end and a distal end of the muscle and each fitting into a respective end of the bladder and of the braid member for sealing the associated end of the muscle and providing a mechanical attachment point at each end of the muscle; wherein each said terminator has first annular land at one end thereof, a first annular recess adjacent said first land and onto which the end of the bladder is attached to form a fluid-tight seal, a second land adjacent said first recess, and a second annular recess adjacent the second land and axially spaced from said first recess and onto which the end of the braid member is secured, so that tensile forces on the terminator are transmitted directly to the braid member and are not applied directly to the end of the bladder.

2. The terminator of claim 1 wherein said terminator is a unitary elongated member.

3. The terminator of claim 1 wherein said terminator has a longitudinal bore communicating with the interior of the bladder.

4. The terminator of claim 1, arranged as a distal end terminator and including means distal to said second annular recess to receive and attach to a control cable.

5. The terminator of claim 1, arranged as a proximal end terminator and including a threaded portion proximally of said second annular recess.

6. The terminator of claim 5, further comprising a tubular barbed fitting extending proximally from said threaded portion.

7. A fluid dynamic muscle which comprises an elongated elastomeric bladder, hydraulic conduit means extending from one end of the bladder for communicating hydraulic pressure with the interior of the bladder, a tubular braid formed of a plurality of substantially inextensible filaments and covering the bladder, the tubular braid permitting said bladder therewithin to expand laterally when hydraulic pressure is applied to it, but restraining the bladder such that as the braid increases in diameter it contracts axially, and a terminator at at least one end of the muscle for fitting into a respective end of the bladder and of the tubular braid for sealing the associated end of the muscle and providing mechanical attachment point at said one end of the muscle, wherein said terminator has a first annular land at one end facing the interior of the tubular bladder, a first annular recess adjacent said first land and onto which the end of the bladder is attached, a second annular land adjacent said first recess, and a second annular recess adjacent the second land and axially spaced from the first recess and onto which the end of the braid member is secured, so that tensile forces on the terminator are not applied directly to the end of the tubular bladder.

8. A fluid dynamic muscle as in claim 7 wherein said tubular bladder is secured onto the first annular recess with a suitable coil of cord wound onto the end of the bladder.

9. A fluid dynamic muscle as in claim 7 wherein said tubular braid is secured onto the second annular recess with a suitable coil of cord wound onto the end of the braid.

10. A fluid dynamic muscle as in claim 7 wherein said terminator has an anchor portion disposed beyond the end of said tubular braid.

11. A terminator combination for a pneumatic or hydraulic muscle of the type that comprises an elongated elastomeric tubular bladder, an elongated tubular braid member disposed over said bladder, one or more generally cylindrical terminators disposed at one or both of a proximal end and a distal end of the muscle and each fitting into a respective end of the bladder and of the braid member for sealing the associated end of the muscle and providing a mechanical attachment point at each end of the muscle; wherein each said terminator has first annular land at one end thereof, a first annular recess adjacent said first land and onto which the end of the bladder is attached, a first securing means for achieving a fluid-tight seal between the end of the bladder and said first annular recess, a second land adjacent said first recess, and a second annular recess adjacent the second land and axially spaced from said first recess and onto which the end of the braid member is attached, and a second securing means for tightly affixing the end of the braid member to said second annular recess, so that tensile forces on the terminator are transmitted directly to the braid member and are not applied directly to the end of the bladder.

12. The terminator combination of claim 11 wherein said terminator is a unitary elongated member.

13. The terminator combination of claim 11 wherein said terminator has a longitudinal bore communicating with the interior of the bladder.

14. The terminator combination of claim 11, arranged as a distal end terminator and including means distal to said annular recess to receive and attach to a control cable.

15. The terminator combination of claim 11, arranged as a proximal end terminator and including a threaded portion proximally of said second annular recess.

16. The terminator combination of claim 15, further comprising a tubular barbed fitting extending proximally from said threaded portion.

17. The terminator combination of claim 11 wherein said first securing means and said second securing means are windings.

* * * * *